United States Patent
Smania

(10) Patent No.: US 11,073,195 B2
(45) Date of Patent: Jul. 27, 2021

(54) PLANETARY GEAR MOTOR WITH TWO COAXIAL OUTPUT SHAFTS

(71) Applicant: Unicum Transmission de Puissance, La Ricamarie (FR)

(72) Inventor: Marco Smania, Lyons (FR)

(73) Assignee: Unicum Transmission de Puissance, La Ricamarie (FR)

( * ) Notice: Subject to any disclaimer, the term of this patent is extended or adjusted under 35 U.S.C. 154(b) by 50 days.

(21) Appl. No.: 16/535,136

(22) Filed: Aug. 8, 2019

(65) Prior Publication Data
US 2020/0049232 A1    Feb. 13, 2020

(30) Foreign Application Priority Data

Aug. 8, 2018   (FR) ..................................... 1857387

(51) Int. Cl.
| | |
|---|---|
| *F16H 1/46* | (2006.01) |
| *B60K 7/00* | (2006.01) |
| *B60K 17/356* | (2006.01) |

(52) U.S. Cl.
CPC .............. *F16H 1/46* (2013.01); *B60K 17/356* (2013.01); *B60K 2007/0046* (2013.01); *B60K 2007/0092* (2013.01); *F16H 2702/06* (2013.01)

(58) Field of Classification Search
CPC .................. F16H 1/46; F16H 2702/06; B60K 2007/0046; B60K 2007/0092; B60K 17/356; H02K 2207/03; H02K 7/116
USPC ....................................................... 475/151
See application file for complete search history.

(56) References Cited

U.S. PATENT DOCUMENTS

| | | | |
|---|---|---|---|
| 2010/0261572 A1* | 10/2010 | Riester | F16H 57/08 475/331 |
| 2013/0274049 A1* | 10/2013 | Zhu | F16H 1/46 475/149 |
| 2014/0031160 A1* | 1/2014 | Suzuki | B60K 17/046 475/149 |
| 2014/0298939 A1 | 10/2014 | Kim et al. | |
| 2014/0371028 A1* | 12/2014 | Billmeyer | F16H 1/46 475/337 |
| 2016/0096548 A1* | 4/2016 | Tigue | H02K 7/116 180/6.7 |

FOREIGN PATENT DOCUMENTS

| | | | | |
|---|---|---|---|---|
| DE | 10300641 | | 7/2004 | |
| EP | 1798843 | | 6/2007 | |
| EP | 3046794 | | 7/2016 | |
| JP | 2005138824 A | * | 6/2005 | ............... B60K 1/00 |
| WO | WO 2011/145791 | | 11/2011 | |

OTHER PUBLICATIONS

Rapport de Recherche Préliminaire et Opinion Ecrite [Preliminary Search Report and Written Opinion] dated Apr. 26, 2019 From the Institut National de la Propriété Industrielle de la République Française, INPI Re. Application No. FR1857387. (8 Pages).

* cited by examiner

*Primary Examiner* — Roger L Pang

(57) ABSTRACT

The invention relates to a geared motor comprising:
- an electric motor crossed, through and through, by a rotor shaft, so as to form two motor output shafts, each output shaft has a pinion;
- at least two planetary gearboxes with at least one stage, each geared with the pinion of a motor output shaft;
- two geared motor output shafts, each being coupled directly or indirectly to a planetary gearbox, the two geared motor output shafts being coaxial with each other.

14 Claims, 6 Drawing Sheets

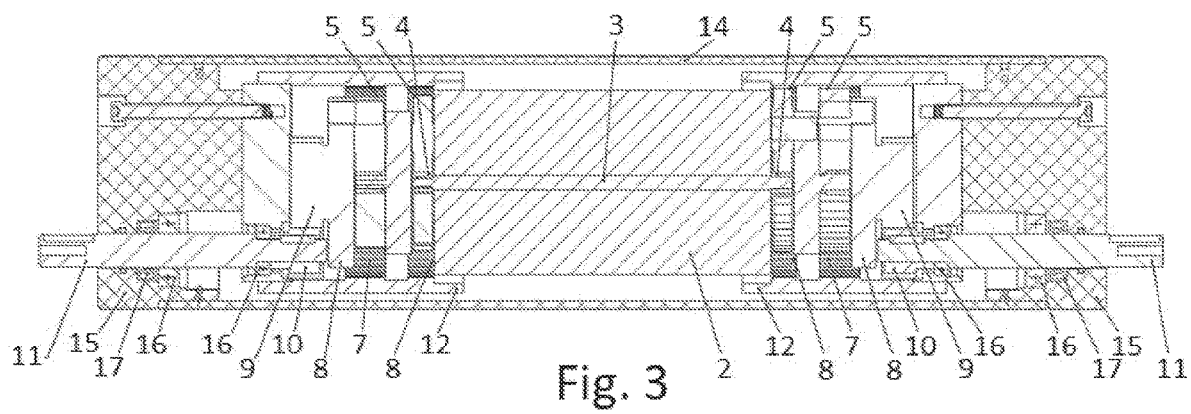
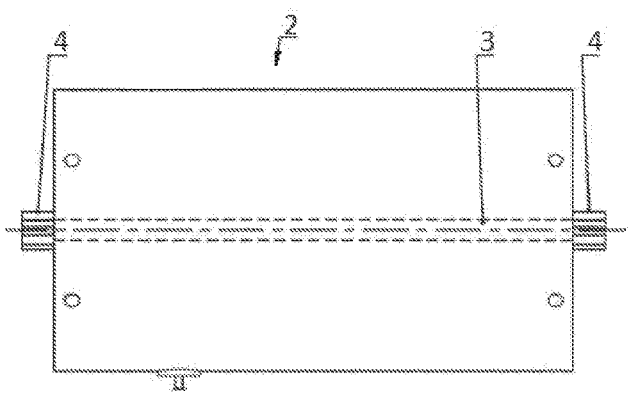
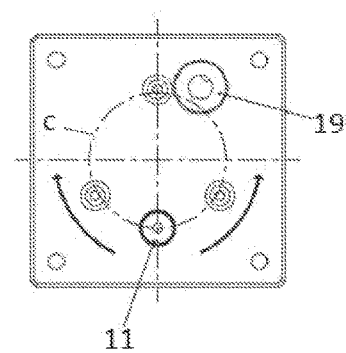

PLANETARY GEAR MOTOR WITH TWO COAXIAL OUTPUT SHAFTS

RELATED APPLICATIONS

This application claims the benefit of priority of French Patent Application No. 1857387 filed on Aug. 8, 2018, the contents of which are incorporated herein by reference in its entirety.

FIELD AND BACKGROUND OF THE INVENTION

This invention relates to the technical field of geared motors, in particular for the translation drive of an element guided by two parallel guiding or driving means positioned on either side of the said element.

The invention has an advantageous application, for example, for the drive in translation of a beam, a gantry, a tarpaulin for covering a tipper of a tipper truck, or a pool shelter or terrace.

Of course, other applications can also be considered.

It is known from the state of the art to use a geared motor to achieve the translational displacement of an element guided by two parallel guiding or driving means, such as rails, located on either side of the element.

The geared motor generally has an electric motor comprising a rotor shaft coupled, for example, to at least one gearbox and an output shaft.

The geared motor is generally installed on one side of the element to be moved, at one of the guiding or driving means and, when the mass of the element to be moved becomes too large, or the distance between the two guiding or driving means becomes too great, there is a risk of damage or entrapment of the drive system.

Indeed, since the guiding or driving means generally have mechanical play, too much thrust on one side of the element to be moved may create an imbalance and cause the element to "diagonally" to the point of damaging or blocking the guiding or driving.

To solve this problem, it is known to use two identical geared motors, positioned on each side of the element to be moved.

This solution makes it possible to eliminate the imbalance, but has disadvantages, particularly economic ones. Moreover, from a technical point of view, this solution requires precise control of the rotation of the two geared motors, in position, speed and torque, in particular in a perfectly synchronized manner.

Indeed, it is necessary to distribute the torque exactly at 50% between the two geared motors to obtain a precise position control of the movement. This requires the use of sophisticated sensors and control electronics, which imposes a burden on the total cost of the system.

It is also known to use a geared motor positioned between the guide means, of the wheel and screw type with a hollow shaft, in cooperation with a through shaft to join the drive means.

This solution is much simpler in terms of control because, since the geared motor has only one output shaft, the torque distribution is perfect. This solution also has an advantage in terms of implementation cost, which is much more economical than the previous implementation.

However, this solution has some disadvantages, particularly in terms of energy, geometry and size.

Indeed, the gear trains used for the state-of-the-art geared motors are, in general, the flat or simple gear train, i. e. with cylindrical gears with parallel shaft lines, the epicyclic or planetary gear train, and the wheel and screw system.

Of these three options, for equivalent torque and equal gear finish quality, the planetary gear is the one that is generally more energy efficient, while the one with the lowest energy efficiency is the wheel and screw system.

Therefore, for the same performance, the electric motor for the wheel and screw system will be much larger and consume much more energy than the electric motor associated with the planetary gearbox.

It follows that these congestion problems pose limitations in terms of implementation and installation, particularly when the motor is intended to be powered by a battery, for example, powered by a solar panel itself.

With regard to the space requirement of the geared motor solution with wheel and screw system, the geared motor body often extends in a direction orthogonal to the axis of rotation, so that it is often expensive and/or complicated to position and accommodate the geared motor in the environment in which it is to be installed.

Another disadvantage of this solution is the height of the output shaft, i. e. the distance between the output shaft and the plane or reception surface of the guiding or driving means.

Indeed, in a typical installation in which the geared motor is positioned upwards and perpendicular to the plane receiving the guide means, to obtain high reduction ratios, the height of the output shaft is often higher than the pinions/wheels/pulleys that allow the element to move. This situation requires manufacturers to use cardan or other spacer and connection systems to recover the coaxial with the pinions/wheels/drive pulleys.

In addition, depending on the application, it is sometimes necessary to count the number of revolutions of the geared motor.

For example, the invention can be used to make a motorization assembly for driving the cover of a pool.

For this purpose, the geared motor includes position sensors to determine the number of revolutions performed by the geared motor unit and to manage the limit switches of the cover.

Patent FR3057891 is known as an innovative solution to the main problem of electronic position sensors in geared motors for pool covers.

Indeed, most of the technologies used consist of electronic sensors (inductive, hall effect, etc.) that are sensitive to overvoltages that are quite frequent in the applications in question (lightning, mains instability, etc.).

Patent FR3057891 addressed these problems by arranging a completely passive component, namely a mechanical sensor.

The reliability of the geared motors has therefore been significantly improved. However, the disadvantages of this technology lie in its dimensions, signal accuracy and cost, which can still be improved.

SUMMARY OF THE INVENTION

One of the aims of the invention is therefore to remedy the disadvantages of the prior art by proposing a geared motor which can be used in applications intended to displace in translation an element with respect to two parallel guiding or driving elements positioned on either side of the element to be displaced, by greatly reducing the risks of blocking or deterioration, while being economical to implement, and by making it possible to reduce to a minimum the distance between the output shafts of the geared motor and the surface or plane on which the guiding or driving means are received.

Another objective of this invention is to provide such a space-saving geared motor, while providing power appropriate to the application concerned.

To this end, and according to invention, a remarkable geared motor has been developed in that it includes:
- an electric motor crossed, through and through, by a rotor shaft, so as to form two motor output shafts, each output shaft having a pinion;
- at least two planetary gearboxes with at least one stage, each geared with the pinion of a motor output shaft;
- two geared motor output shafts, each being coupled directly or indirectly to a planetary gearbox, the two output shafts being coaxial with each other.

In this way, the geared motor according to invention can be used in an application consisting in moving an element in translation with respect to two parallel guiding or driving means, being positioned between the two guiding or driving means. From the above, and since the geared motor has two mechanically synchronized output shafts, the control of the geared motor is simplified and the problems of blocking or jamming the guidance or drive system are greatly reduced. In addition, the geared motor incorporates planetary gearboxes and therefore has a high power output compared to the small size of the electric motor.

According to different embodiments, and depending on the application and power requirements, the geared motor comprises several, and at least two planetary gearboxes coupled to each other, positioned on each side of the electric motor. Planetary gear units are at least one-stage, preferably at least two or more stages.

According to one embodiment, the geared motor output shafts are each directly coupled to a planetary gearbox, so that the output shafts are coaxial with the rotor shaft of the electric motor.

According to another embodiment, and when it is necessary to bring the axis of the geared motor output shafts as close as possible to the body of the geared motor, and in particular to the surface or plane of reception of the guiding or driving means, the geared motor output shafts are coupled indirectly to the planetary gearbox, and in particular by means of a simple gear train, so that the geared motor output shafts are eccentric with respect to the rotor shaft of the electric motor.

This solution therefore makes it possible to eccentrate the axis of the output shafts with respect to the axis of the rotor shaft of the electric motor, and therefore makes it possible to reduce the distance between the axis of the output shafts and the surface or reception plane of the guiding or driving means, or more generally between the axis of the output shafts and the body of the geared motor. However, it is therefore possible, depending on the position of the simple gear train, to vary the position of the output shafts around a circle whose center is materialized by the axis of the rotor shaft of the electric motor. In other words, it is therefore possible to increase or decrease the distance between the axis of the geared motor output shafts and the surface or reception plane of the guiding or driving means, depending on the position of the single gear train around the axis of the rotor shaft.

In practice, this further reduces the size of the geared motor, and allows different diameters of pinions/wheels/drives of the guide or drive means to be used to get as close as possible to the surface or the reception plane of the said guide or drive means. The resulting advantage is the possibility of avoiding the use of cardan shafts or complex systems to be coupled to the guiding or driving means.

According to a particular embodiment, each planetary gearbox includes a crown, and the crowns are arranged inside a tubular housing. In this configuration, the tubular housings inside which the crowns are arranged can be extended around the electric motor to directly form the body of the geared motor, and the tubular housings can be closed by two flanges from which the geared motor output shafts project.

To further reduce the space requirement, facilitate fixing, and allow the axis of the geared motor output shafts to be brought as close as possible to the surface or reception plane of the guide or drive means, the fixing flanges are square, with sides of a length substantially equal to the diameter of the tubular housings. Thus, the motor gearbox is fixed, for example by means of screws, positioned only in the corners of the square flanges.

According to another embodiment, and depending on the application concerned, the geared motor comprises an outer housing formed by a hollow tubular body containing the various elements of the geared motor, and sealed at both ends by flanges through which the geared motor output shafts protrude in a sealed manner.

Of course, the fixing flanges of this embodiment are preferably square with sides of a length substantially equal to the diameter of the outer housing.

Another objective is to provide a geared motor with the means to count its number of revolutions, in a simple, space-saving and inexpensive way, and which can be perfectly used in a wet environment, for example near or immersed in a swimming pool, without being sensitive to overvoltages (lightning, instability of the sector, etc.).

For this purpose, the geared motor according to the invention comprises at least one magnet positioned on a rotating element of the geared motor, and a flexible blades switch positioned on a fixed part of the geared motor, opposite the magnet when the rotating element is driven in rotation, the switch is intended to be operated when the magnet passes in front of the switch to allow the number of revolutions of the rotating element to be counted.

The flexible blades switch is also known as reed switch, and is a magnetic switch whose two contacts are magnetized and placed in a bulb or plastic envelope containing nitrogen in general.

The switch closes in the same way as a mechanical sensor, i. e. by opening and closing an electrical circuit. The main difference is that the movement of the microswitch is generated by a variation of a magnetic field and not by a spring. In this way, its reliability and durability are optimal. It is also not subject to overvoltages, lightning, etc. and is therefore perfectly suitable for being near or immersed in a swimming pool for example.

Preferably, a plurality of magnets are positioned on the rotating element, evenly distributed around the axis of rotation of the rotating element.

The magnets pass in front of the flexible blades switch to activate the switch. Since the movement is rotary, the number of magnets used will give the accuracy of the encoder: e. g. 12 magnets give an encoder that detects an angular displacement of 30°. This also makes it possible to count the number of revolutions of the rotating element of the geared motor.

In practice, the rotating element is for example at least one of the output shafts of the geared motor According to one embodiment, a ring is fixed around the output shaft; the ring has a wall receiving the magnet(s).

The arrangement of the ring with magnets and the flexible blades switch is very compact, inexpensive and provides an optimal electrical signal that then allows the rotational speed of the rotating element to be increased.

Different arrangements are possible. According to a first embodiment, the magnets are received on a front wall of the ring, orthogonal to the output shaft, so that the magnets are oriented coaxially to the output shaft.

Alternatively, the magnets can be received on a side wall of the ring, parallel to the output shaft, so that the magnets are oriented radially with respect to the output shaft.

The flexible blades switch is mounted on any fixed part facing the ring, such as for example embedded in a fixed flange around the output shaft, or in a side flange.

The distance between the magnets and the flexible blades switch can be adjusted according to the power of the magnets by using specific machining, mechanical stops, screw fixing, gluing in a seat machined for this purpose, etc.

The magnet(s) are positioned on a rotating element of the geared motor, and can also, without leaving the scope of the invention, on at least one of the output shafts, or for example on the rotor of the electric motor to have a much finer precision, in particular "n" times more important, "n" being the reduction ratio of the gearbox. In the latter configuration, a ring equipped with magnets can, for example, extend the rotor of the electric motor.

BRIEF DESCRIPTION OF THE SEVERAL VIEWS OF THE DRAWINGS

Other advantages and technical features will emerge better from the following description of the geared motor according to the invention, given as an example without limitation from the attached figures, in which:

FIG. 3 is a longitudinal cross-sectional view of the geared motor in FIG. 1;

FIG. 4 is a front view of the electric motor used in the geared motor;

FIG. 5 is a side view of the geared motor in FIG. 1, illustrating a square flange for mounting the geared motor;

DESCRIPTION OF SPECIFIC EMBODIMENTS OF THE INVENTION

Figure 1:
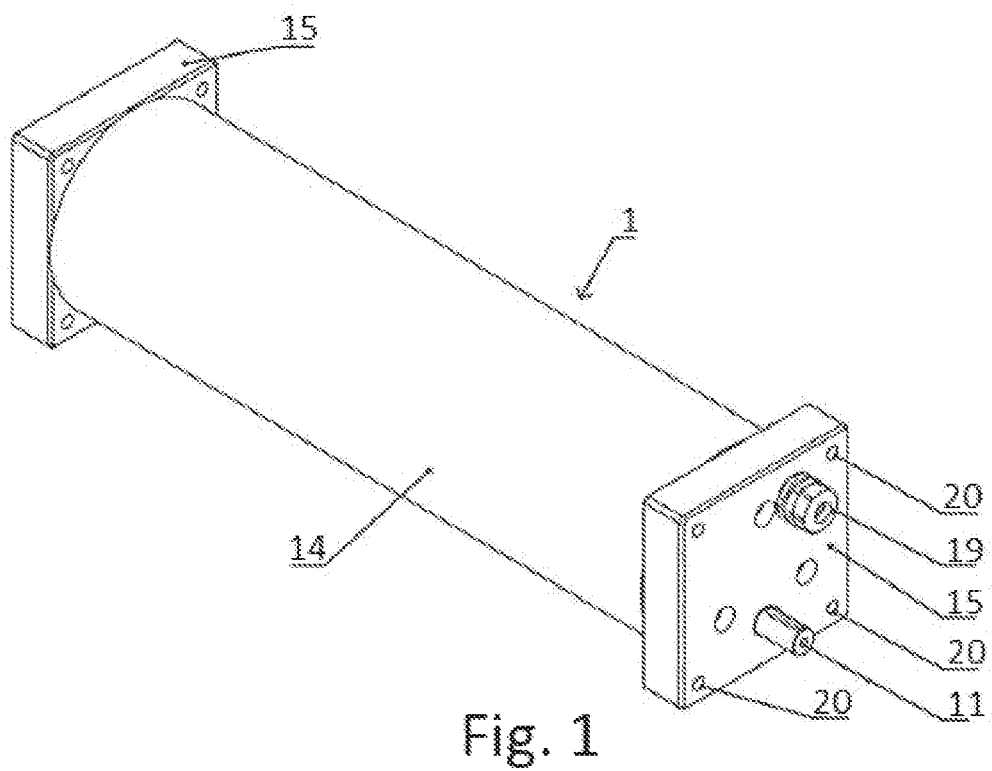
FIG. 1 is a perspective view of a preferred embodiment of the geared motor according to the invention.

With reference to FIGS. 1 to 6, the invention relates to a geared motor (1), in particular for applications involving the translational displacement of an element in relation to two parallel guiding or driving means positioned on either side of the element to be moved.

For example, the geared motor (1) can be used to move a gantry by means of two shafts at the end of which are arranged pinions/pulleys, cooperating for example with transmission chains/cables.

The geared motor (1) can, in another application, be used to move a tarpaulin covering a tipper of a tipper truck, a shelter or a pool terrace, for example by means of two shafts at the end of which are arranged drive wheels.

The geared motor (1) according to the invention is preferably tubular and is a planetary geared motor (1) with two coaxial outputs shafts with, as an option, the possibility of eccentrating the output shafts in order to be able to adapt to the size of the pinions/wheels/drives.

More precisely, the geared motor (1) comprises an electric motor (2) crossed, through and through, by a rotor shaft (3) defining two motor output shafts and equipped with pinions (4) at each of its ends.

The pinions (4) of the motor output shafts act as input shafts for two planetary gearboxes (5), symmetrically arranged on either side of the electric motor (2).

The planetary gearboxes (5) are at least one stage, preferably two or more stages, and are each greased with the pinion (4) of a motor output shaft.

For this purpose, and in a known manner, the planetary gearboxes (5) each comprise a crown gear (6) with an inner gear and positioned around a solar pinion, and at least two and preferably three satellite pinions (7) engraved on the one hand with the solar pinion and on the other hand with the crown gear (6). In the embodiment illustrated in the drawings, the geared motor (1) comprises two planetary gearboxes (5) coupled to each other on each side of the electric motor (2), and the crowns (6) are arranged inside a tubular housing (12).

Each planetary gearbox (5) has an output (8), which, in a particular embodiment, can be directly coupled to a motor gearbox output shaft. In this configuration, not shown, the geared motor output shafts are coaxial with each other and coaxial with the rotor shaft (3) of the electric motor (2).

This embodiment makes it possible to ensure, by means of a geared motor (1) positioned between the two means of guiding or driving the element to be moved, a synchronized and mechanically reliable central drive.

In applications where the space requirement is large, and where it is necessary to lower the axis of the geared motor output shafts (11) as far as possible to bring them closer to the surface or reception plane of the guiding or driving means, in particular to adapt to the size of the pinions/wheels/drive pulleys, the output shafts (8) of the planetary gearboxes (5) are coupled to simple gear trains, in particular constituted by an output pinion (9) of the planetary gearbox (5) engaged with a pinion (10) fixed to the motor gearbox output shaft (11).

Thus, the output shafts (11) of the geared motor are eccentric with respect to the rotor shaft (3) of the electric motor (2).

In this way, and with reference to FIG. 5, the position of the axis of the geared motor output shafts (11) can be moved along and around a circle (C), and in particular around the axis of the rotor shaft (3) of the electric motor (2), depending on the desired distance between the axis of the geared motor output shafts (11) and the surface or reception plane of the guiding or driving means.

Another solution to vary this distance is, for example, to rotate the tubular geared motor (1) directly around the axis of the rotor shaft (3), without changing the position of the output shafts (11) of the geared motor (1).

The geared motor (1) according to the invention therefore makes it possible to lower the axis of the geared motor output shafts (11) as far as possible, in order to bring them closer to the surface or reception plane of the guiding or driving means, and thus to adapt to the diameter of the pinions/wheels/drive pulleys, and thus to be able to reduce the diameter of these driving means.

Figure 2:
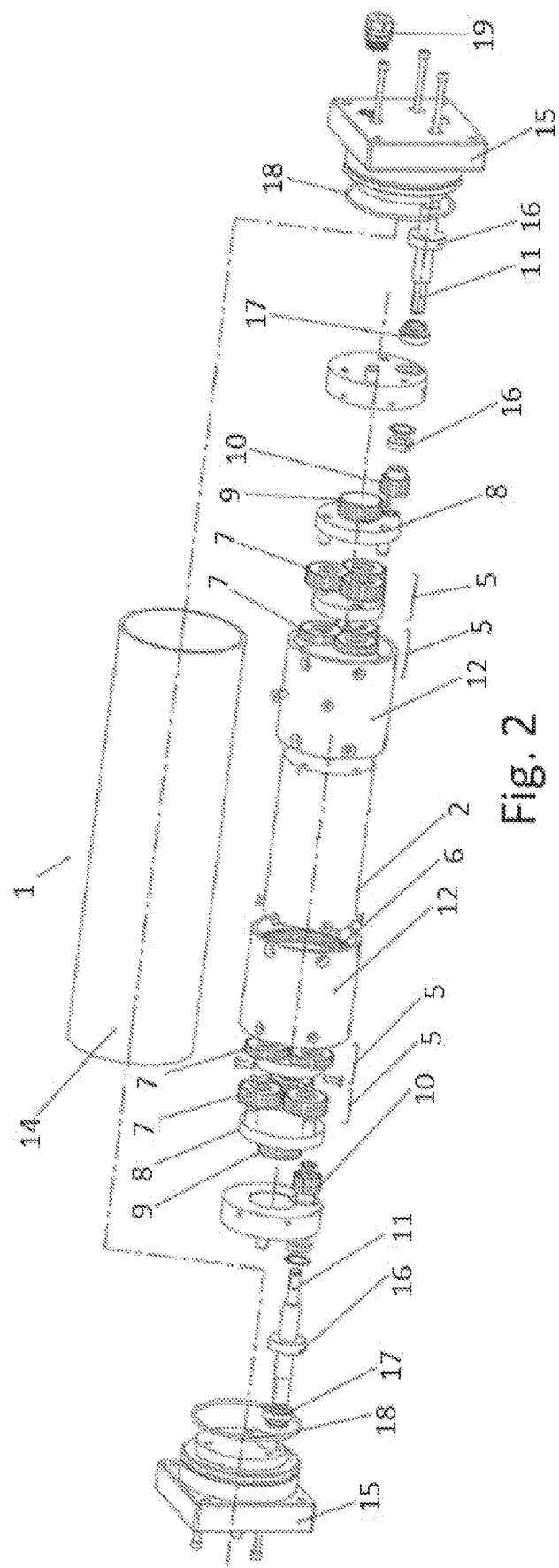
FIG. 2 is a similar view of the one of FIG. 1, in exploded perspective.

According to one embodiment, in particular that shown in FIGS. 1 to 3, it is sometimes necessary to ensure a certain tightness of the geared motor (1). In this situation, the geared motor (1) comprises, for example, a tubular outer housing (14), preferably made of PVC, enclosing the various components of the geared motor (1), and sealed at both ends by fixing flanges (15), also preferably made of PVC, through which the geared motor output shafts (11) project in a sealed manner. More precisely, the geared motor output shafts (11) are passed through ball bearings (16) and a lip seal (17) to ensure tightness. A cable gland (19) is used to seal the power cables of the electric motor (2).

For the maximum fixing and lowering of the axis of the geared motor output shafts (11), the fixing flanges (15) have a square shape with sides of a length substantially equal to the diameter of the outer casing (14), to allow fixing by means of screws (20) at the corners of this square shape.

Thus, the flanges (15) do not raise the geared motor (1), and the fixing can be carried out via, for example, fixing screws positioned at the corners of the square flanges (15).

Figure 6:
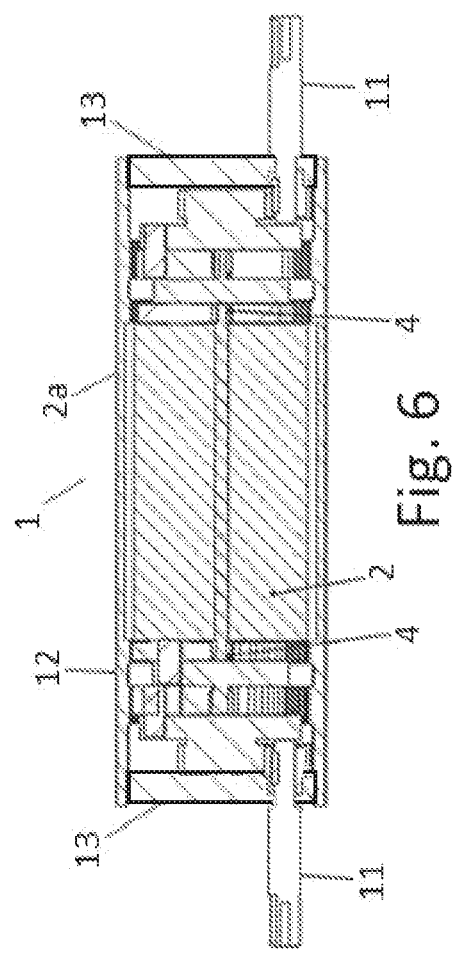
FIG. 6 illustrates a simplified shape of the geared motor according to the invention, without a waterproof housing.

According to another embodiment illustrated in FIG. 6, and when the sealing is not important, the tubular housing (12) inside which the crowns (6) are arranged can be extended around the electric motor (2) to form directly the body (12*a*) of the geared motor (1).

In this configuration, the tubular housing (12) are closed by flanges (13) from which the geared motor output shafts (11) project.

Depending on the application, the flanges (13) can be used to secure the geared motor (1) in its environment. The flanges (13) can, of course, be of any suitable shape. However, if it is necessary to lower the axis of the geared motor output shafts (11) as far as possible, the flanges (13) should preferably be square in shape with sides of a length substantially equal to the diameter of the tubular housing (12).

It follows from the foregoing that the invention does indeed provide a geared motor (1) which can be used in applications intended to displace in translation an element with respect to two parallel guiding or driving elements, positioned on either side of the displaced element, greatly reducing the risks of blocking or deterioration, while being economical, and while allowing the distance between the output shafts (11) of the geared motor and the surface or plane of reception of the guiding or driving means to be reduced to a minimum.

In addition, depending on the application, it is sometimes necessary to count the number of revolutions of the geared motor (1).

For example, the invention may be used to make a motorization assembly for driving a cover of a swimming pool, immersed or near the pool.

For this purpose, the geared motor (1) includes position sensors to determine the number of revolutions performed by the geared motor unit (1) and to manage the limit switches of the pool cover.

For example, the geared motor (1) comprises at least one magnet (21) positioned on a rotating member of the geared motor (1), and a flexible blades switch (22) positioned on a fixed part of the geared motor (1), opposite the magnet (21) when the rotating member is driven in rotation, the switch (22) is intended to be operated when the magnet (21) passes in front of the switch (22) to allow the number of revolutions of the rotating member to be counted.

More precisely, and with reference to FIGS. 7 to 10, the geared motor (1) comprises a ring (23) fixed around the rotating element of the geared motor (1), such as around at least one of the output shafts (11).

The ring (23) has a wall, lateral or frontal, receiving a plurality of magnets (21) evenly distributed around the output shaft (11).

When rotating the output shaft (11), the magnets (21) are intended to pass successively in front of the soft blades switch (22), activated by the passage of the said magnets (21), to know the position of the output shaft (11) and to count the number of revolutions used, for example, to determine the end positions of the cover of a swimming pool.

The flexible blades switch (22) is positioned on a fixed part of the geared motor (1), facing alternately and successively with each magnet (21) when the output shaft (11) is driven in rotation.

Figure 7:
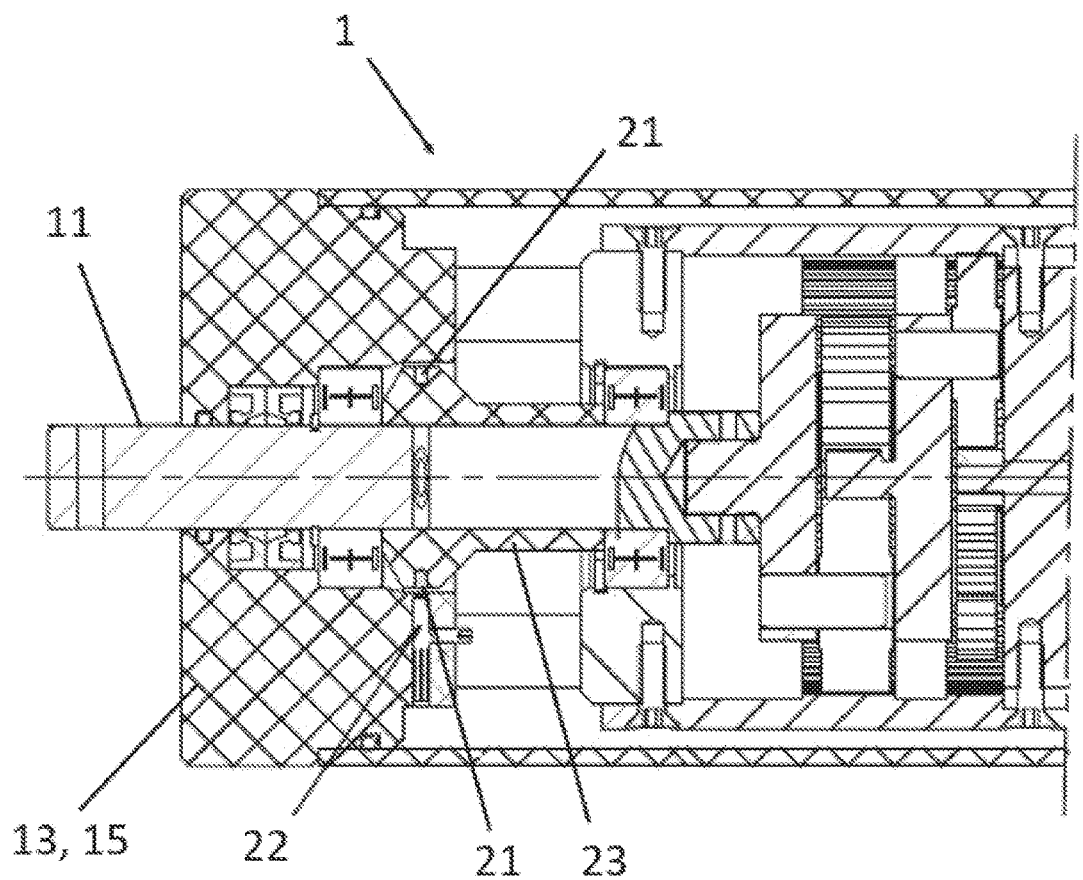
FIG. 7 is a detail view of one end of the geared motor, in longitudinal section, illustrating the ring provided with radially oriented magnets.
Figure 8:
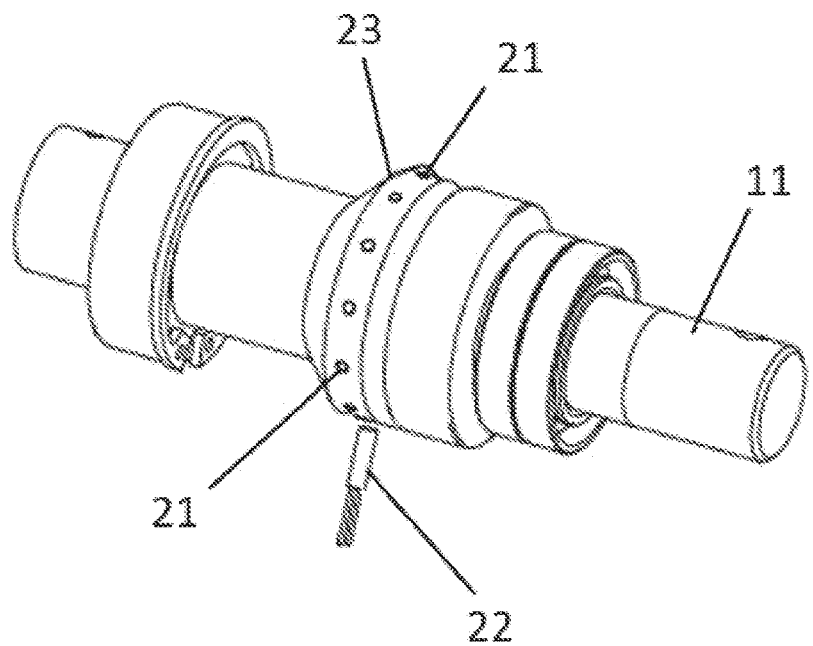
FIG. 8 is a perspective view of the ring arrangement in FIG. 7.

With reference to FIGS. 7 and 8, when the magnets (21) are received on the side wall of the ring (23), parallel to the output shaft (11), the magnets (21) are oriented radially with respect to the output shaft (11). The switch (22) is then positioned facing each other and oriented radially.

Figure 9:
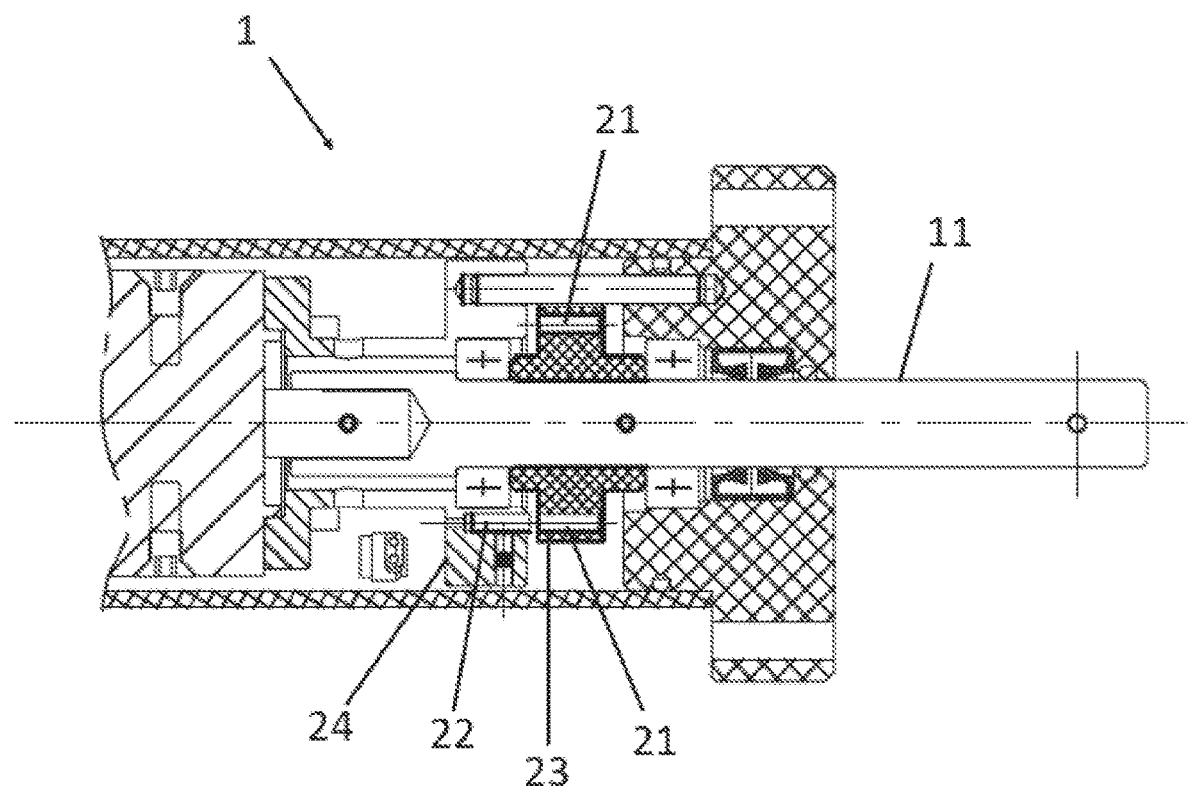
FIG. 9 is a detail view of one end of the geared motor, in longitudinal section, illustrating the ring provided with axially oriented magnets.
Figure 10:
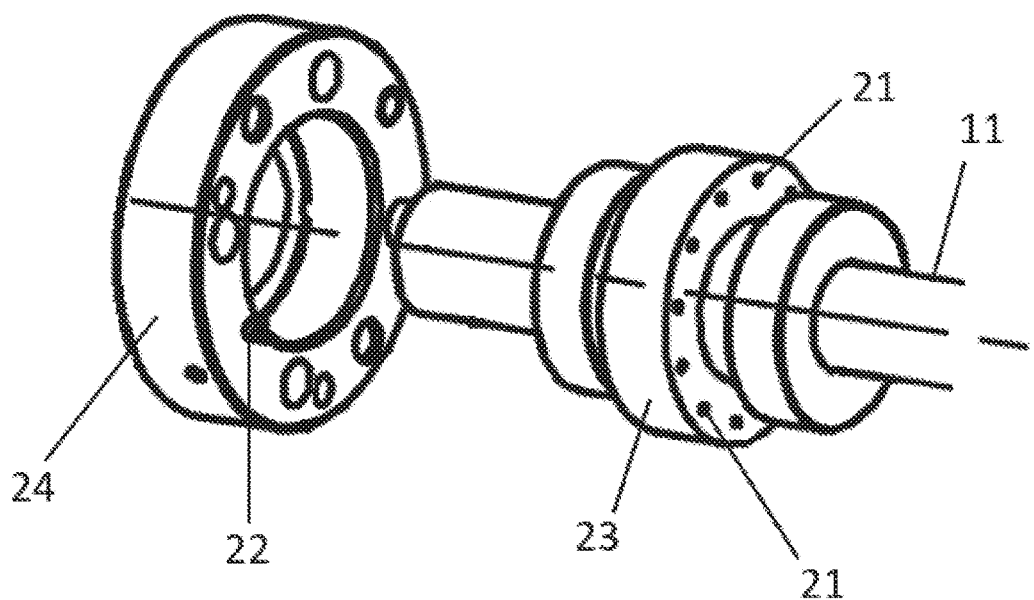
FIG. 10 is a perspective view of the ring arrangement in FIG. 9.

With reference to FIGS. 9 and 10, when the magnets (21) are received on the front wall of the ring (23), orthogonal to the output shaft, the magnets (21) are oriented coaxially to the output shaft. The switch (22) is then positioned facing each other and oriented axially.

In either configuration, the switch (22) is mounted on any fixed part opposite the passage of the magnets (21), such as for example fixed or embedded in a fixed flange (24) around the output shaft, or fixed or embedded in a side flange (13, 15).

What is claimed is:

1. Geared motor wherein the geared motor comprises:
    an electric motor crossed, through and through, by a rotor shaft, so as to form two output shafts of the electric motor, each of the output shafts of the electric motor has a pinion; and
    at least two planetary gearboxes with at least one stage, each of the at least two planetary gearboxes is geared with the respective pinion of one of the two output shafts of the electric motor;
    wherein each of the two output shafts of the geared motor is coupled directly or indirectly to one of the at least two planetary gearboxes,
    wherein the two output shafts of the geared motor are coaxial with each other;
    wherein the geared motor comprises at least one magnet positioned on a rotating element of the geared motor, and a reed switch positioned on a fixed part of the geared motor, opposite the magnet when the rotating element is driven in rotation, the switch is intended to be actuated when the magnet passes in front of the switch to allow a number of revolutions of the rotating element to be counted;
    wherein the rotating element is at least one of the output shafts of the geared motor.

2. Geared motor according to claim 1, wherein the planetary gearboxes have at least two stages.

3. Geared motor according to claim 1, wherein the geared motor comprises two planetary gearboxes coupled to each other on each side of the electric motor.

4. Geared motor according to claim 1, wherein the output shafts of the geared motor are each directly coupled to a planetary gearbox, so that the output shafts of the geared motor are coaxial with the rotor shaft of the electric motor.

5. Geared motor according to claim 1, wherein the output shafts of the geared motor are coupled indirectly to the planetary gearboxes and via a single gear train, so that the output shafts of the geared motor are eccentric with respect to the rotor shaft of the electric motor.

6. Geared motor according to claim 1, wherein each planetary gearbox comprises a crown, the crowns being arranged inside a tubular housing.

7. Geared motor according to claim 6, wherein the tubular housings inside which the crowns are arranged extend around the electric motor to directly form a body of the geared motor, the tubular housings being closed by two flanges from which the output shafts of the geared motor project.

8. Geared motor according to claim 7, wherein the flanges are square, with sides of a length equal to a diameter of the tubular housings.

9. Geared motor according to claim 1, wherein the geared motor comprises a tubular outer housing enclosing the components of the geared motor, sealed at both ends by fixing flanges through which the output shafts of the geared motor project in a sealed manner.

10. Geared motor according to claim 9, wherein the fixing flanges are square, with sides of a length equal to a diameter of the outer housing.

11. Geared motor according to claim 1, wherein a plurality of magnets are positioned on the rotating member, evenly distributed about an axis of rotation of the rotating member.

12. Geared motor according to claim 1, wherein a ring is fixed around the output shaft of the geared motor, the ring has a wall receiving the magnets.

13. Geared motor according to claim 12, wherein the magnets are received on a front wall of the ring, orthogonal to the output shaft of the geared motor, so that the magnets are oriented coaxially to the output shaft of the geared motor.

14. Geared motor according to claim 12, wherein the magnets are received on a side wall of the ring, parallel to the output shaft of the geared motor, so that the magnets are oriented radially with respect to the output shaft of the geared motor.

* * * * *